United States Patent [19]
Loose et al.

[11] Patent Number: 4,603,819
[45] Date of Patent: Aug. 5, 1986

[54] SEAT BELT RETRACTOR

[75] Inventors: Richard D. Loose, Birmingham; Joseph W. Struck, Sterling Heights, both of Mich.

[73] Assignee: General Motors Corporation, Detroit, Mich.

[21] Appl. No.: 788,090

[22] Filed: Oct. 15, 1985

Related U.S. Application Data

[63] Continuation of Ser. No. 580,375, Feb. 22, 1984, abandoned, Continuation-in-part of Ser. No. 487,977, Apr. 25, 1983, abandoned.

[51] Int. Cl.[4] .................. B60R 22/38; B60R 22/40
[52] U.S. Cl. .................. 242/107.4 A; 242/107.4 B; 242/107.7; 280/806
[58] Field of Search .............. 242/107.4 R–107.4 E, 242/107.6, 107.7, 107.12, 107; 280/803, 806–808; 297/475–478

[56] References Cited

U.S. PATENT DOCUMENTS

| | | | |
|---|---|---|---|
| 3,667,698 | 6/1972 | Fisher | 242/107.4 D |
| 3,944,163 | 3/1976 | Hayashi et al. | 242/107.4 R |
| 4,083,511 | 4/1978 | Ikesue | 242/107.4 A |
| 4,159,809 | 7/1979 | Rawson | 242/107 |
| 4,164,335 | 8/1979 | Kondziola | 242/107.4 A |
| 4,189,109 | 2/1980 | Takada | 242/107.4 A |
| 4,366,934 | 1/1983 | Seifert et al. | 242/107.4 A |
| 4,422,594 | 12/1983 | Honl | 242/107.4 A |
| 4,429,840 | 2/1984 | Chawla et al. | 242/107.7 |

FOREIGN PATENT DOCUMENTS 2097238 11/1982 United Kingdom ........ 242/107.4 B Primary Examiner—John M. Jillions
Attorney, Agent, or Firm—Charles E. Leahy

[57] ABSTRACT

A seat belt retractor is comprised of a minimum number of component parts which may be interchangeably and optionally assembled upon a standard frame to provide a desired combination of mechanisms which control rotation of the belt reel. The optional control mechanisms include spring windup, belt sensitive lockup, vehicle sensitive lockup, and a comfort device for relieving tension on the belt. A pair of support members abut against the side walls of the frame to carry the control mechanisms and have integral bushings which journal the reel shaft. Covers are provided to enclose the operating mechanisms and have plug-in projections which extend through aligned apertures of the support members and frame side walls to attach the support members and associated control mechanism interchangeably on either of the frame side walls. The frame has first and second opposed facing pairs of mounting apertures to selectively mount the lock bar for engagement with oncoming sprocket teeth regardless of the selected direction of belt unwinding reel rotation. One of the support members carries the inertia weight and has first and second pairs of oppositely arranged apertured mounting bosses for selective alternate mounting of a lock bar energizing pawl to orient the pawl for engagement with oncoming gear teeth carried by the sprocket regardless of the direction of belt unwinding reel rotation.

4 Claims, 29 Drawing Figures

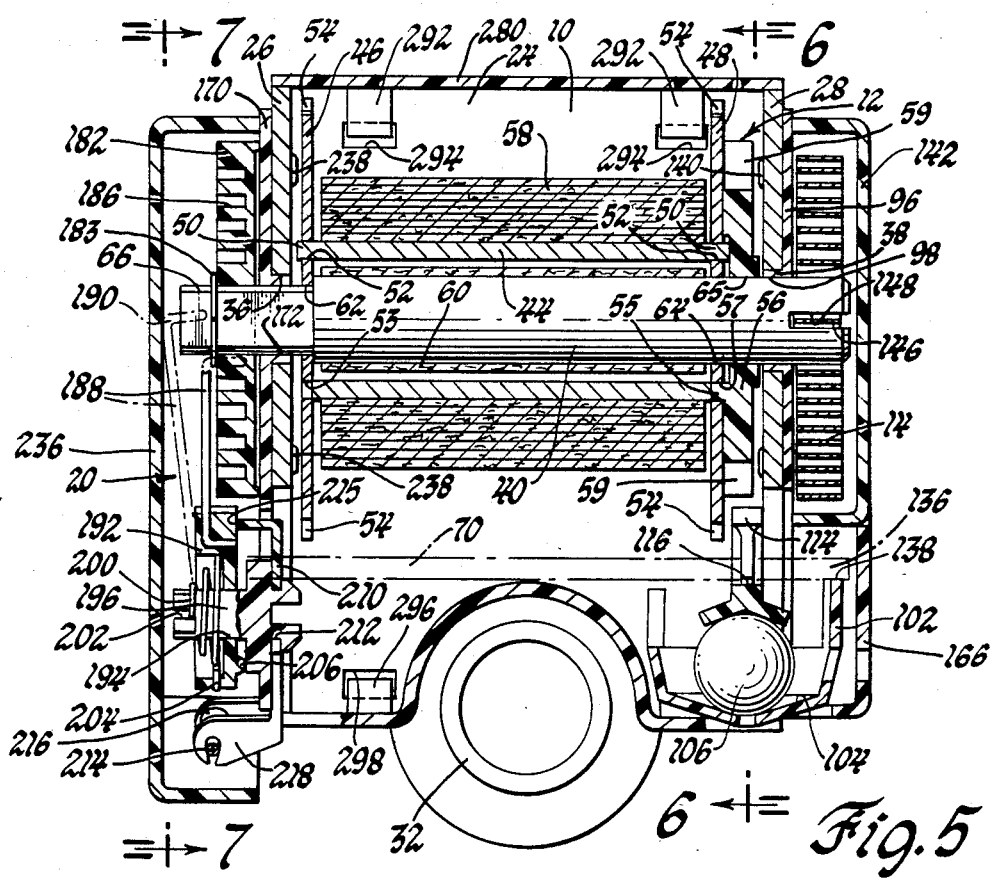

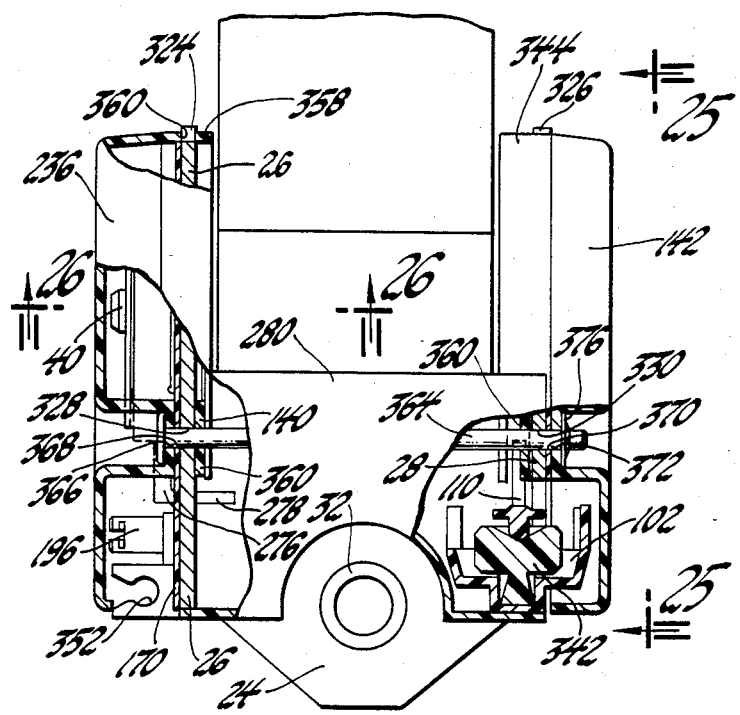

SEAT BELT RETRACTOR

This is a continuation of co-pending application Ser. No. 580,375 filed on Feb. 22, 1984, now abandoned, which is a continuation-in-part of application Ser. No. 487,977, filed Apr. 25, 1983, now abandoned.

The invention relates to a seat belt retractor and more particularly provides a modular retractor construction by which a minimum number of component parts comprise modules which may be interchangeably and optionally assembled upon a standard frame in multiple variations to provide a combination of desired features such as spring windup, belt sensitive lockup, vehicle sensitive lockup and comfort enhancing tension relief for compliance with diverse government regulations and customer expectations in worldwide markets and to provide a retractor arrangement and package size to fit various vehicle models and styles.

BACKGROUND OF THE INVENTION

As the motor vehicle industry becomes more competitive and international in scope, it is necessary for motor vehicle manufacturers to expand the manufacturing and distribution of motor vehicle products across national boundaries. this has given rise to the design of so-called world cars in which a particular motor vehicle model is designed to be simultaneously assembled and distributed in worldwide markets while the vehicle components may be manufactured in only one or two countries.

A serious constraint on this worldwide manufacturing and marketing strategy resides in the fact that governments in various nations have different regulations governing the motor vehicles to be made or sold in that country. This is particularly the case with regard to safety equipment such as seat belt systems. As a result it is common for a manufacturer of a so-called world car to manufacture or purchase more than one type of seat belt retractor for use in a particular model of vehicle body.

Seat belt retractors commonly include a frame having a base wall for attachment to a motor vehicle structure such as a pillar. The frame also has side walls with aligned apertures to receive a shaft which rotatably mounts a belt reel. A spiral spring acts between the housing and the reel shaft to bias the reel in the direction to wind up the restraint belt. A lock bar extends between the housing side walls and is movable into engagement with a pair of sprockets carried by the belt reel to lock the reel against belt unwinding rotation.

A sensing mechanism is conventionally provided to lock up the reel by moving the lock bar into engagement with the reel sprockets. The sensing mechanism may be responsive to vehicle deceleration or to the rate of belt unwinding from the reel. The vehicle sensitive locking mechanism includes a ball or pendulum which moves relative to the lock bar upon occurrence of a vehicle deceleration condition to move the lock bar to the locked condition.

The belt sensitive locking mechanism includes a weight which is carried by the reel and lags behind rotation of the reel in response to a certain condition of belt unwinding to initiate movement of the lock bar to the locked position. The vehicle sensitive locking feature is preferred in the United States and Canada but the belt sensitive locking feature is permissible. However, in Europe, governmental regulations require the use of both a vehicle sensitive locking mechanism and a belt sensitive locking mechanism. Accordingly, it is necessary to design, tool, and inventory more than one retractor even though the vehicle in which the retractor is used is intended for worldwide manufacture and distribution.

Another feature available in seat belt retractors is a tension relief mechanism, also known as comfort mechanism, which includes a pawl and ratchet arrangement to lock the reel against rotation in the belt windup direction so that the belt is held at a slackened tension-free length about the occupant. This feature has gained wide acceptance in the United States and Canada.

Another factor contributing to the proliferation of seat belt retractor designs is that it is sometimes desirable to have the belt exit from the back side of the reel adjacent the frame base wall and then in other vehicle installation it is desirable to have the belt exit off the front side of the reel away from the base wall. For example, in those vehicles where the belt is to be hidden behind a plastic trim panel attached to the pillar, the belt exits off the back side of the reel so that the belt lies close along the pillar.

Heretofore it has been necessary to design and tool a particular seat belt retractor arrangement for each new motor vehicle, taking into account the direction of belt exit from the retractor, as well as the governmental requirements and customer preferences for each part of the world where such vehicles will be sold.

It would be desirable to provide a universally adaptable retractor which could be assembled from off-the-shelf standard components to meet the particular requirements of each new vehicle offering. Such a retractor would compress the time required for product introduction, deproliferate the parts inventory, and substantially reduce tooling costs for new vehicle models.

SUMMARY OF THE INVENTION

According to the invention a retractor frame includes spaced apart side walls having aligned apertures receiving a reel shaft to rotatably mount the toothed sprockets of a belt reel. The side walls have a first pair of aligned apertures to pivotally mount a lock bar for movement into engagement with oncoming sprocket teeth when the reel is mounted for belt unwinding rotation in one direction and also has a second pair of aligned apertures for mounting the lock bar when the reel is optionally mounted for belt unwinding rotation in the opposite direction of rotation. Support members of injection molded plastic and generally planar configuration overlie the frame side walls on the opposite side thereof from the reel and have integral bushings which project axially into the apertures receiving the reel shaft to mount the shaft for low friction rotation. One of the support members carries a cup member supporting the inertia weight and pivotally mounts a pawl movable by the inertia weight into engagement with oncoming gear teeth carried by the sprocket so that the gear teeth further move the pawl into engagement with the lock bar to engage the lock bar with the oncoming sprocket teeth. First and second pairs of oppositely arranged apertured mounting bosses are provided for alternate mounting of the pawl for engagement with the oncoming gear teeth regardless of the selected belt unwinding direction of rotation of the reel and gear teeth carried thereby. The second support member carries a pawl engageable with a spiral cam keyed to the reel shaft for rotation therewith and cooperates to provide a comfort device which selectively locks the reel against rotation in the belt winding direction to thereby hold the belt extended at a certain slackened length to enhance occupant comfort. Each of the support members and each of the frame side walls have a plurality of similarly configured and aligned apertures therethrough. A first cover is provided for enclosing a windup spring acting between the cover and one end of the reel shaft and a second cover is provided for mounting on the second support member and enclosing the comfort device or a belt sensor optionally mounted on the other end of the reel shaft. Each of the covers has a plurality of plug-in securing elements which are matingly configured and aligned with the apertures of the first and second side walls and the support members to enable interchangeable and optional utilization of said support members and the mechanisms carried thereby on either of the first and second side walls of the retractor frame. A molded plastic cover for the retractor has first and second belt slots therethrough to accommodate belt exit from the retractor regardless of the direction of belt unwinding reel rotation. Furthermore, the second cover enclosing the comfort device has entry passages on both sides thereof to accommodate optional entry of a plunger operated release cable for releasing the comfort device.

One object, feature and advantage of the invention resides in the provision of a plurality of aligned apertures on both side walls of a retractor frame and upon a control mechanism support member adapted to abut the frame side wall and in the further provision of a cover for enclosing the control mechanism and having plug-in securing elements matingly configured and aligned with the apertures in the side walls of the frame and the support member to enable optional mounting of the support member on either of the side walls of the frame.

Another object, feature and advantage of the invention resides in the provision of a support member mounted on one of the side walls of the frame for mounting an inertia weight and having first and second apertured mounting bosses to enable alternate mounting of a pawl for pivotal movement into engagement with oncoming gear teeth carried by the belt reel in either of the selected clockwise or counterclockwise direction of belt unwinding rotation.

BRIEF DESCRIPTION OF THE DRAWINGS

These and other objects, features and advantages of the invention are apparent upon consideration of the description of the preferred embodiment and the appended drawings in which:

FIG. 5 is a frontal elevation view of a retractor having a vehicle sensor and a comfort device;

FIG. 6 is a sectional view taken in the direction of arrows 6—6 of FIG. 5 and showing the vehicle sensor;

FIG. 7 is a sectional view taken in the direction of arrows 7—7 of FIG. 5 and showing the comfort device;

FIG. 24 is a frontal elevation view of the retractor assembled from the parts shown in FIG. 23 and having a belt sensor and a comfort device arranged in accord with FIG. 15;

FIG. 25 is a view taken in the direction of arrows 25—25 of FIG. 24;

FIG. 26 is a sectional view taken in the direction of arrows 26—26 of FIG. 24;

DESCRIPTION OF THE PREFERRED EMBODIMENT

Figure 1:
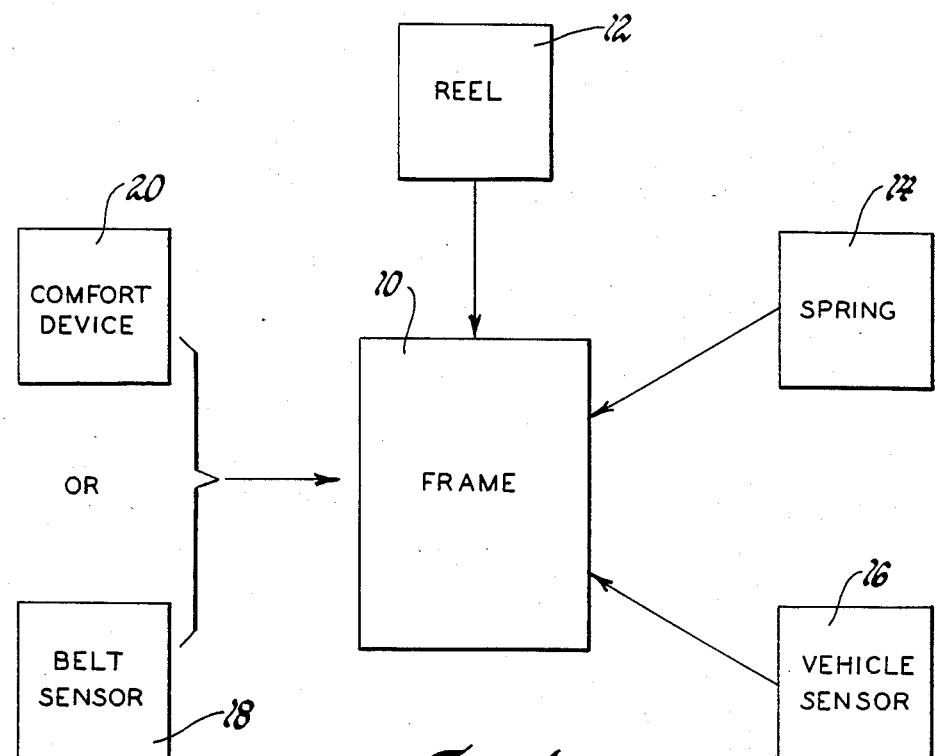
FIG. 1 is a schematic representation of the seat belt retractor including frame, the reel, the spring, the vehicle sensor, the belt sensor, and the comfort device.

FIG. 1 is a schematic depiction of the seat belt retractor of this invention. A frame 10 receives a reel 12 which may be mounted for clockwise or counterclockwise rotation as will be discussed further hereinafter with reference to FIGS. 2 and 3. The spring 14 may be mounted on either side of the frame to bias the reel in the belt windup direction. Various mechanisms for controlling the rotation of the reel 12 relative to the frame 10 include a spring 14, vehicle sensor 16, belt sensor 18 and comfort device 20.

The vehicle sensor 16 is provided for locking up the reel 12 in response to a sensed condition of vehicle deceleration. The vehicle sensor 16 may be mounted on either side of the frame 10. The belt sensor 18 may be employed to lock up the reel 12 in response to a sensed condition of rapid unwinding of belt from the reel.

The belt sensor 18 is mounted on the opposite side of the frame 10 from the vehicle sensor 16 and spring 14 but can also be used without the vehicle sensor 16. The comfort device 20 is provided to lock the reel against belt windup rotation so that the belt is held at a slackened tension free length about the occupant. Either the comfort device 20 or the belt sensor 18 may be employed on a particular retractor.

THE FRAME

Figure 2:
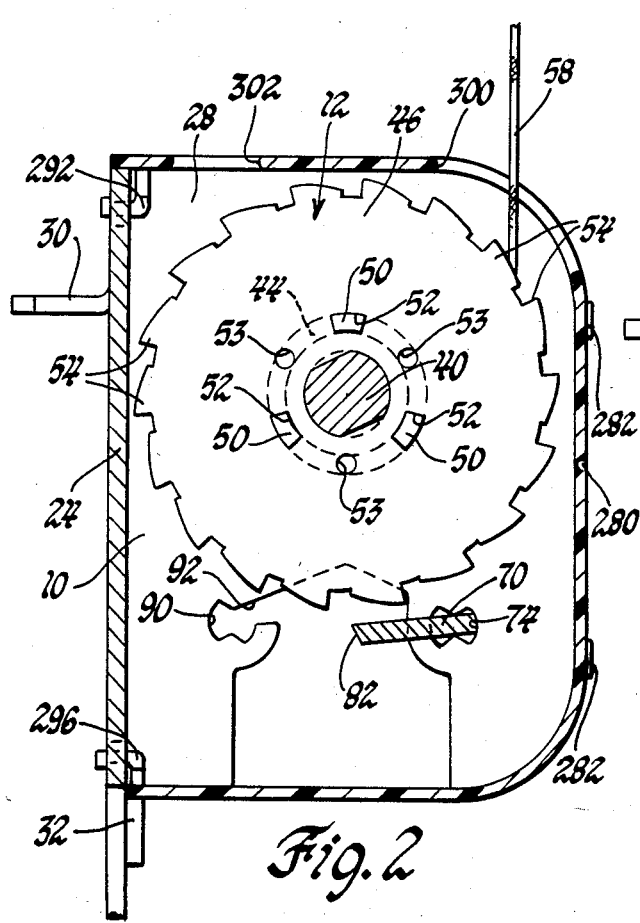
FIG. 2 is a side elevation view of a retractor frame and reel according to the invention.
Figure 4:
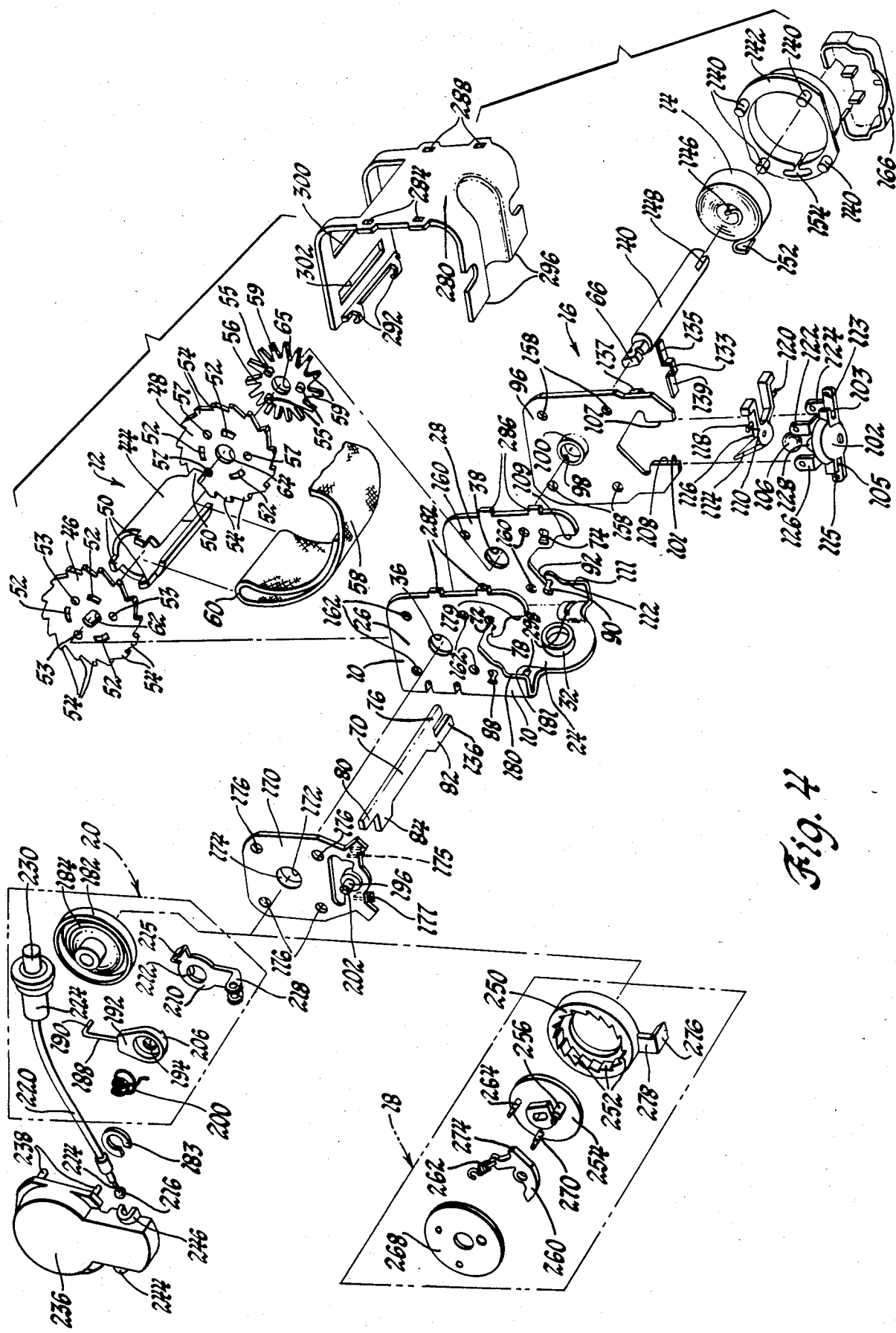
FIG. 4 is an exploded perspective view showing each of the retractor parts which may be interchangeably and optionally assembled upon a standard frame to provide a combination of selected features.

Referring to FIGS. 2 and 4, it is seen that the retractor frame 10 includes a base wall 24 and laterally spaced apart side walls 26 and 28. The base wall 24 has a T- shaped projection 30 which is adapted to fit into a receptacle in the pillar of a motor vehicle body, not shown. The base wall 24 also has an apertured boss 32 for receiving a bolt to attach the base wall 24 to the vehicle pillar. The side walls 26 and 28 have aligned apertures 36 and 38 for receiving and rotatably mounting reel shaft 40.

THE REEL

As best seen in FIGS. 2, 4 and 5, belt reel 12 includes a spool 44 comprised of a C-shaped metal stamping. A pair of sprockets 46 and 48 are attached to the end of the spool 44 by a plurality of stakes 50 which extend through aligned slots 52 in the sprockets. The sprockets 46 and 48 have a plurality of circumferentially spaced sprocket teeth 54 which face in the belt unwinding direction of reel rotation. A gear 56 of molded plastic has a plurality of projections 55 which extend into mating holes 57 in the sprocket 48 so that the gear 56 rotates in unison with the reel. The sprocket 46 has similarly arranged mating holes 53 which permit mounting of gear 56 on sprocket 46 as well as sprocket 48. Gear 56 has gear teeth 59 which face in the belt unwinding direction.

Restraint belt 58 has an end loop 60 which enters the spool 44 and encircles the reel shaft 40. The sprockets 46 and 48 have central apertures 62 and 64 which receive the reel shaft 40. Gear 56 has a similar central aperture 65. The aperture 62 is configured to nonrotatably receive a necked down flattened end 66 of the reel shaft 40 so that the reel shaft 40 rotates in unison with the reel assembly 42.

Figure 3:
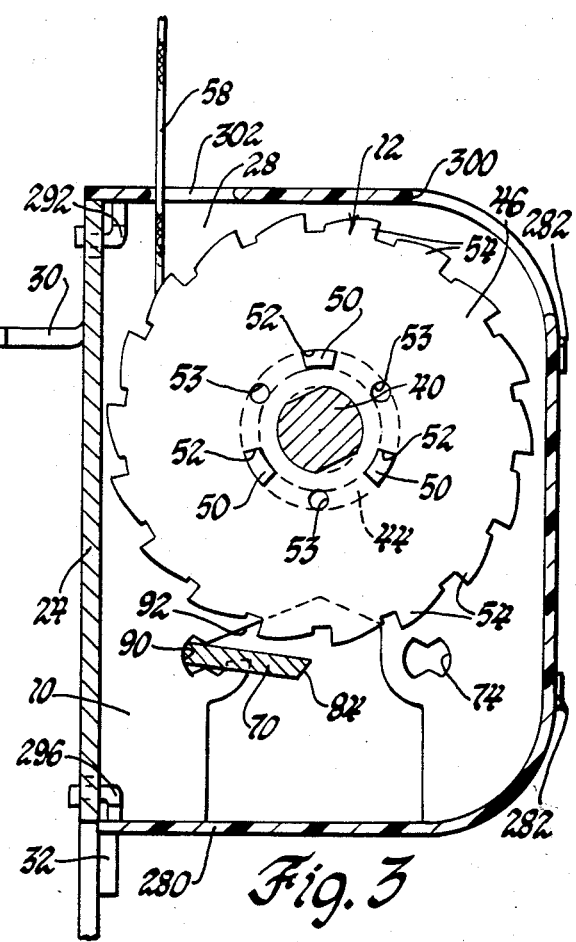
FIG. 3 is a view similar to FIG. 2 but showing the retractor arranged for reel rotation in the opposite direction.

Referring to FIGS. 2 and 3 it will be understood that the reel 12 may be mounted on the frame 10 as shown in FIG. 2 so that the belt 58 exits the retractor off the front side of the reel 12 away from the base wall 24. On the other hand, as seen in FIG. 3, the belt reel may be mounted for rotation in the opposite direction so that the belt 58 will exit off the back side of the reel 12 adjacent to the base wall 24. The arrangement of FIG. 3 is desirable in vehicle body arrangements where the belt 58 is to be hidden behind a plastic trim panel attached to the body pillar.

In FIG. 2, the sprocket rotates in the counterclockwise direction and its teeth 54 face in the counterclockwise direction. On the other hand, in FIG. 3 unwinding the belt 58 from the reel assembly 12 rotates the reel assembly in the clockwise direction so that the sprocket teeth 54 face in the clockwise direction.

A lock bar 70 is pivotally mounted on the frame 10 for movement into locking engagement with the sprocket teeth 54 to lock the reel 12 against belt unwinding rotation so that the length of the belt is fixed and the seated occupant restrained thereby. As best seen in FIGS. 2, 3 and 4, the frame side walls 26 and 28 have two pairs of aligned lock bar mounting apertures which are situated on opposite sides of the reel shaft. The first pair of locking apertures includes an aperture 72 in the side wall 26 and an aperture 74 in the side wall 28. A lug 76 of the lock bar 70 is inserted into the aperture 74. An entry slot 78 in the side wall 26 communicates to the aperture 72 to enable a lug 80 at the other end of the lock bar to seat within the aperture 72. The apertures 72 and 74 are butterfly-shaped to permit the lock bar 70 to pivot from the disengaged position of FIG. 2 to a pivotally raised position in which locking teeth 82 and 84 of the lock bar 70 engage with the oncoming sprocket teeth 54 of the reel 12 to lock the reel against further rotation in the belt unwinding direction.

The second pair of apertures for mounting lock bar 70 include an aperture 88 in the side wall 26 and aperture 90 in the side wall 28. An entry slot 92 communicates with the aperture 90. As seen in FIG. 3, the lock bar lugs 76 and 80 are mounted within the apertures 88 and 90. By the provision of first and second pairs of lock bar mounting apertures, it will be understood that a single frame 10 may be employed regardless of whether the reel 12 is to rotate in the clockwise or counterclockwise directions of rotation.

THE VEHICLE SENSOR AND SPRING

The vehicle sensor 16 is carried by a support 96 best shown in FIGS. 4 and 5. The support 96 is an injection molded plastic unit which is generally planar in configuration and shaped to overlie either of the side walls 26 and 28 of the retractor frame 10. Support 96 has an aperture 98 which aligns with the reel shaft aperture of the frame side wall and an integral bushing 100 which projects through the side wall aperture to provide a bushing which insures low friction rotation of the reel shaft 40 relative to the retractor frame.

A cup member 102 is carried at the lower edge of the support 96 and defines an upwardly opening depression 104 in which an inertia weight 106 such as a stainless steel ball is mounted. The cup member 102 is a separately molded plastic element which has opposed facing recesses 103 and 105 which capture walls 107 and 108 defining a cutout aperture 101 in support 96 and walls 109 and 111 defining a similarly shaped cutout aperture 112 in frame side wall 28. Cup member 102 is assembled to the support 96 by seating apertures 113 and 115 of the cup member 102 onto mating projections, not shown, molded on the support 96. Alternatively, the cup member 102 may be molded integrally with the support 96.

A pawl 110 is pivotally mounted upon the cup member 102 and rests upon the inertia weight 106. The pawl 110 has a pawl tooth 114 which is poised beneath the gear 56 carried by the reel 12.

The pivotal mounting of the pawl 110 upon the cup member 102 is provided by a pivot pin 118 which projects from one side of the pawl 110 and a similar pivot pin 120 which projects from the other side of the pawl 110. The pivot pins are pivotally received within a first pair of apertured mounting bosses 122 and 124 of the cup member 102. A similar pair of apertured mounting bosses 126 and 128 are provided on the other side of the cup member 102 for pivotally mounting the pawl 110 in those retractors where the reel 12 is to rotate in the opposite direction of rotation from that shown in the retractor arrangement depicted in FIGS. 4, 5 and 6.

Referring again to FIG. 6, it will be understood when the motor vehicle experiences a rapid deceleration condition, the momentum of the inertia weight 106 will cause the inertia weight 106 to roll up the depression 104 and thereby pivotally raise the pawl 110 so that its pawl tooth 114 engages an oncoming tooth 59 of the gear 56. An initial unwinding rotation of the reel as the belt 58 restrains the occupant will rotate the gear tooth 59 into further engagement with the pawl tooth 114 so that the pawl 110 is further pivoted and a pad 116 of the pawl 110 will engage with an operating tab 136 of the lock bar 70 to pivot the lock bar 70 into locking engagement with the sprocket teeth 54 and accordingly lock the reel against any further rotation in the belt unwinding direction. The operating tab 136 normally rests upon a stop 138 of the cup member 102 to poise the lock bar at the precise position of FIG. 6 in readiness for actuation by the pawl 110. As best seen in FIG. 4, a spring 133 underlies the lug 76 of lock bar 70 and has a leg 135 bearing on an abutment 137 of support 96 and a leg 139 bearing upon the operating tab 136. The spring 133 holds the lock bar 70 poised at its position of FIGS. 5 and 6 engaging the stop 138.

Referring again to FIGS. 4 and 5, it is seen that the support 96 is mounted upon the frame side wall 28 by plug-in elements 140 provided on the spring cover 142. The spring cover 142 is a molded plastic shaped member which is adapted to enclose a spiral spring 14. The spring 14 includes an inner tab 146 which seats within a slot 148 in the end of the reel shaft 40. Spring 14 also has an outer tab 152 which seats within a retainer slot 154 in the cover 142. The plug-in elements 140 extend through aligned and mating apertures 158 in the support 96 and apertures 160 in the frame side wall 28. The plug-in elements 140 and apertures 158 and 160 are preferably provided in a circular pattern symmetrical about the reel shaft 40. The plug-in elements 140 are heat staked to provide a permanent connection between the spring cover 142 and the frame side wall 28 which captures the support 96 therebetween.

As seen in FIG. 4, the frame side wall 26 has a plurality of aperatures 162 which have the same shape and spacing and location as the apertures 160 of the frame side wall 28. Accordingly, it will be understood that the support 96 and spring cover 142 may be optionally installed onto the frame side wall 26 in those retractor constructions where such a configuration is required or desired. A snap-on molded plastic cover 166 is provided to enclose the cup member 102.

THE COMFORT DEVICE

Figure 8:
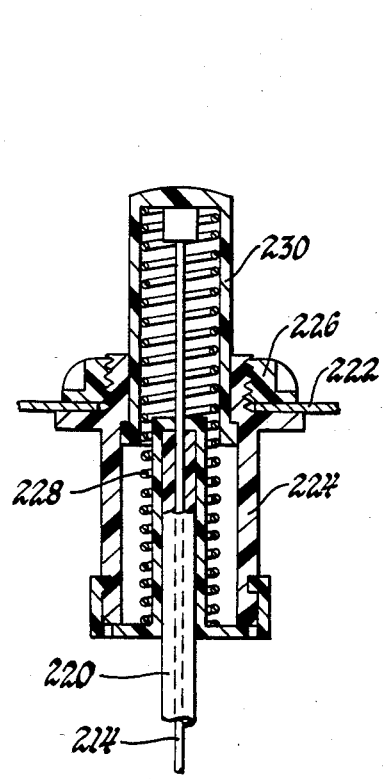
FIG. 8 is a sectional view showing the plunger mechanism for releasing the comfort device.

The comfort device 20 is best shown in FIGS. 4, 7 and 8. The comfort device 20 is carried by a support 170 which is an injection molded plastic unit similar to the support 96. The support 170 has a central aperture 172 for receiving the reel shaft 40 and includes an integral bushing 174 which extends into the aperture 36 of the frame side wall 26 to assure low friction rotation of the reel shaft 40. Support 170 also has opposed facing recesses 175 and 177 which capture walls 179 and 181 defining a cutout aperture 180 in frame side wall 26. Furthermore, the support 170 has a plurality of apertures 176 which mate and align with the apertures 162 provided in the frame side wall 26 as well as the apertures 160 of the frame side wall 28.

The comfort device 20 includes a spiral cam 182 of molded plastic. The spiral cam 182 fits upon the flattened end 66 of the reel shaft 40 and is retained by a retainer ring 183 so that the spiral cam 182 rotates in unison with the shaft and reel 12. In general, the spiral cam 182 includes a plurality of spiral tracks 184 which contain various ramps and cams leading to a plurality of ratchet teeth 186 shown in FIG. 7. A follower pawl 188 rides within one of the plurality of spiral tracks 184. The follower pawl 188 includes a bent wire 190 mounted upon a molded plastic base 192 having a central aperture 194 which fits over a pivot pin 196 integrally molded with the support 170. A coil spring 200 encircles the pivot pin 196 and has its end retained in a retention slot 202 on the end of the pivot pin 196. The other end of the spring is seated in a retention hole 204 of the base 192. The spring 200 functions to urge rotary movement of the follower pawl 188 radially inward to the phantom line indicated position of FIG. 7 and to also urge tilting movement about fulcrum 206 provided on the base 192.

Reference may be had to U.S. Pat. No. 4,002,311 issued Jan. 11, 1977 to Robert C. Fisher for a complete explanation of the structure and function of the spiral cam 182 and follower pawl 188. In general, a slight extension of the belt 58 from the retractor subsequent to having buckled the belt about a seated occupant causes the follower pawl 188 to engage one of the ratchet teeth 186 so that the follower pawl 188 blocks the spiral cam 182 and the reel 12 rotating in unison therewith against subsequent rotation in the belt rewinding direction. Accordingly, belt 58 is held extended at a slackened tension free length about the seat occupant. Then if the occupant intentionally unwinds additional belt from the reel 12 the ramps and cams of the spiral cam 182 function to disengage the follower pawl 188 from the ratchet teeth 186 to enable subsequent rewinding of the belt upon the reel.

The retractor also includes an auxiliary release for the comfort device according to the teachings of U.S. Pat. No. 3,973,786 issued to Lloyd W. Rogers, Jr. on Aug. 10, 1976. This release mechanism includes a release cam 210 which has a central aperture 212 by which the release cam 210 is pivotally mounted upon pivot pin 196 integral with the support 170. The release cam has a ramp surface 215 which underlies the base 192 of the follower pawl 188 oppositely from the fulcrum 206. Accordingly, upon pivotal movement of the release cam 210 from its solid line position of FIG. 7 to the phantom line position, the ramp surface 215 tilts the cam follower pawl 188 against the bias of spring 200 from the solid line indicated position of FIG. 5 to the phantom line position so that the follower pawl will be disengaged from any of the ratchet teeth 186 engaged thereby. The release cam 210 is operated by a cable 214 having an enlarged end 216 which is snap retained in an apertured tab 218 of the release cam 210.

The cable 214 is enclosed in a sheath 220 which leads to a plunger assembly shown in FIG. 8. The plunger assembly includes a housing 224 which is mounted on door pillar 222 by a plastic nut 226. A coil compression spring 228 is captured within the housing 224 and biases a plunger 230 outwardly into the path of the vehicle door. When the door is opened, the coil compression spring 228 extends the plunger 230 to the extended position of FIG. 8 so that the cable 214 attached to the plunger is pulled to effect rotation of the release cam 210 from the solid line indicated position of FIG. 7 to the phantom line indicated position.

As best seen in FIGS. 4 and 5, the comfort device 20 is enclosed by a molded plastic cover 236. The cover has a plurality of plug-in elements 238 which project therefrom and are shaped and configured to extend through the aligned apertures 176 of the support 170 and apertures 162 of the frame side wall 26. Plug-in elements 238 are heat staked to provide a permanent retention of the cover 236 to the frame side wall 26 and capture the support 170 at its position abutting with the frame side wall 26. As best seen in FIG. 7 the cover 236 has bosses 244 and 246 located on opposite sides thereof so that the cable 214 and the sheath 220 thereof can enter the cover 236 from either direction. Accordingly the comfort device 20 can be modified to enable either clockwise or counterclockwise belt unwinding rotation by merely providing a different spiral cam member 182 and release cam 210.

THE BELT SENSOR

Figure 9:
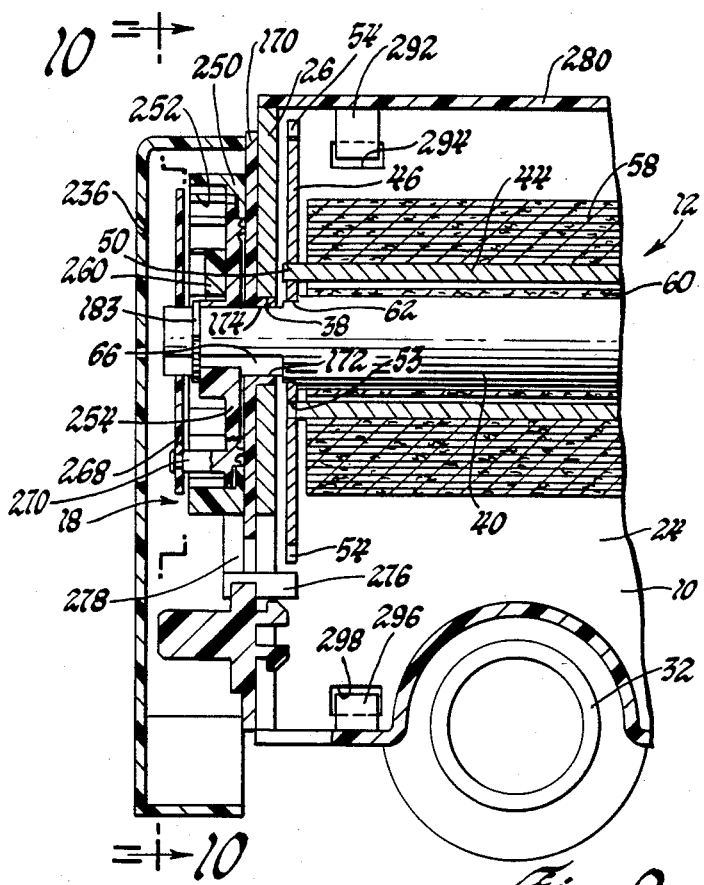
FIG. 9 is a frontal elevation view showing a retractor having a belt sensor.
Figure 10:
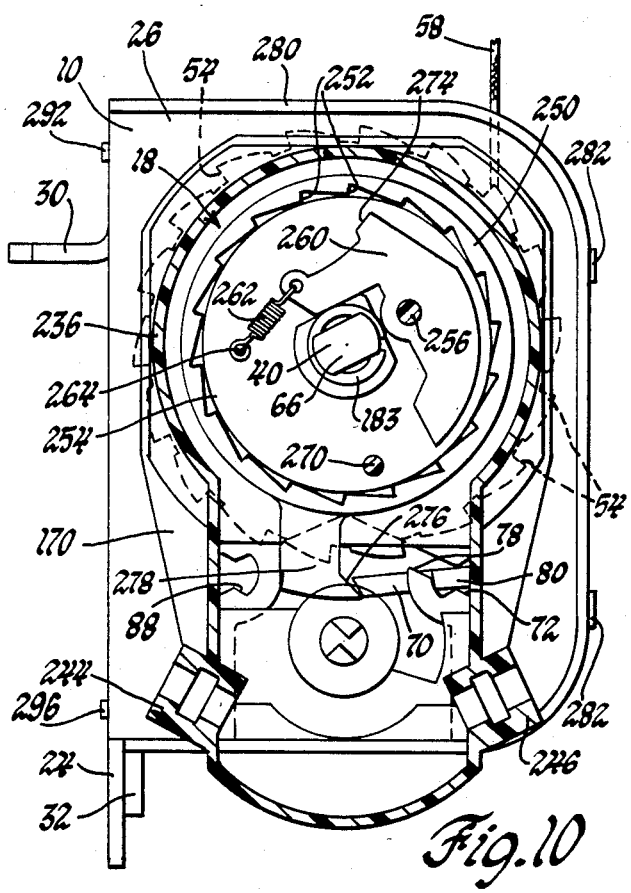
FIG. 10 is a sectional view taken in the direction of arrows 10—10 of FIG. 9.

Referring to FIGS. 4, 9 and 10, it is seen that the belt sensor 18 of the retractor may be employed in place of the comfort device 20. The belt sensor 18 includes an annular clutch 250 having a plurality of teeth 252 formed on the inner surface thereof. A molded plastic extension 254 fits over the flattened end 66 of the reel shaft 40 and is retained thereon by the retainer ring 183. The extension 254 rotates in unison with the reel shaft 40 but permits the clutch 250 to rotate independently or remain at rest during rotation of the shaft. Extension 254 has an integrally molded pin 256 which pivotally mounts a flyweight 260. A coil tension spring 262 seats on a pin 264 of the extension 254 and is connected to the flyweight 260 so that the flyweight 260 is normally retained in a position of FIG. 10 during belt winding and unwinding. A retainer 268 fits over the shaft 40 and the pins 256 and 264 as well as an additional pin 270. Heat staking of the pins provides a permanent attachment so that the flyweight 260 is retained upon pivot pin 256.

As best seen by referring to FIG. 9, the support 170 is interposed between the frame side wall 26 and the cover 236 so that its integral bushing 174 assures low friction rotation of the reel shaft 40. The plug-in elements 238 of the cover 236 retain both cover 236 and the support 170 in place.

In the event that a rapid vehicle deceleration results in a forward movement of the occupant relative to the seat, the rapid rate of unwinding of the belt 58 from the retractor will cause the flyweight 260 to pivot about pin 256 so that a tooth 274 of the flyweight 260 will engage with one of the plurality of teeth 252 on the clutch 250. Resulting rotary movement of the clutch 250 in the belt unwinding direction of rotation causes a ramp face 276 on a depending arm 278 molded integrally with the clutch to engage with the lock bar 70 and thereby lift the lock bar into locking engagement with one of the oncoming sprocket teeth 54.

Figure 11:
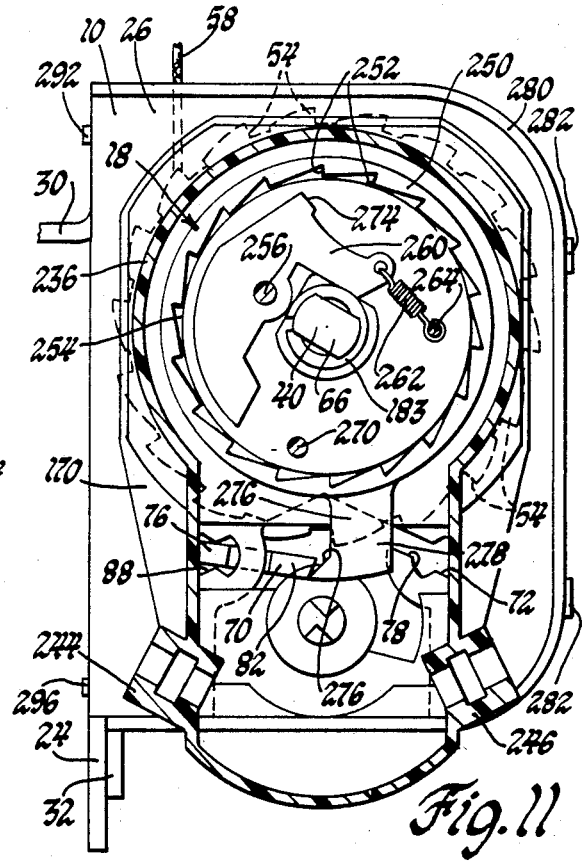
FIG. 11 is a view similar to FIG. 10 but showing the retractor arranged for belt unwinding reel rotation in the opposite direction from FIG. 10.
Figure 12:
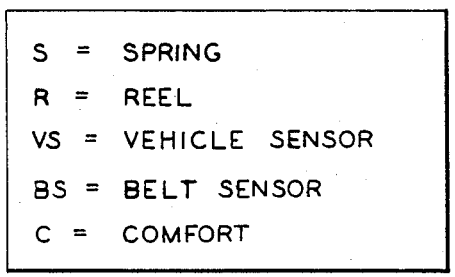
FIG. 12 is a legend for use in interpreting FIGS. 13 through 22, 28 and 29.

FIG. 11 is a view similar to FIG. 10 but showing the belt sensor mechanism applied to a seat belt retractor in which the reel is rotating in the opposite direction because the belt exits off the back side of the reel 12 adjacent to the frame base wall 24.

THE COVER

A cover 280 is provided for enclosing the retractor. The cover 280 is of injection molded plastic and is snap retained upon the frame 10. As best seen in FIG. 4 the frame side wall 26 has a pair of projections 282 which extend into mating receptacles 284 provided in the cover 280. Likewise the frame side wall 28 has a pair of projections 286 which extend into receptacles 288 provided in the cover 280. At the upper wall of the cover 280, a pair of upturned tabs 292 snap into a pair of apertures 294 in the frame base wall 24 as best shown in FIGS. 5 and 6. Similar downturned projections 296 at the lower wall of the cover 280 snap fit into apertures 298 provided in the frame base wall 24 of the frame.

As best seen in FIGS. 2, 3 and 4, the cover 280 has a belt exit slot 300 through which the belt exits in those retractor arrangements where the belt exits the reel on the front side away from the base wall 24. The cover 280 also has a belt exit slot 302 for exit of the belt 58 in those retractor arrangements such as shown in FIG. 3 where the belt exits the reel at the back side thereof adjacent to the base wall 24.

OPTIONAL AND INTERCHANGEABLE ASSEMBLY ARRANGEMENTS

FIGS. 13 through 22 show various ways in which the modules may be interchangeably and optionally assembled upon the standard retractor frame to provide various combinations of desired features, arrangements and package sizes.

Figure 13:
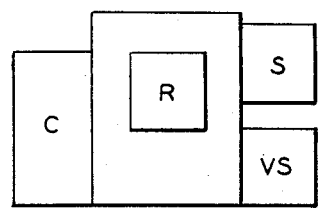
FIGS. 13 through 22 are schematic representations showing the various ways in which the retractor components may be interchangeably and optionally assembled to provide a combination of desired features.
Figure 14:
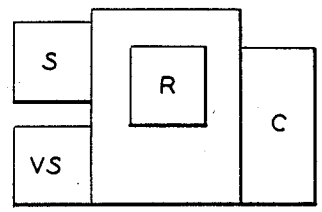

FIG. 13 shows the retractor arrangement of FIGS. 5, 6 and 7 where the spring and vehicle sensor are mounted on the right hand side of the frame via a support 96. The comfort device is mounted on the left hand side of the retractor via a support 170. FIG. 14 shows a retractor which also has the spring, vehicle sensor, and comfort features of the retractor of FIG. 13 except that the retractor is assembled with the spring and vehicle sensor and their support 96 mounted on the left hand side of the frame 10 while the comfort device is mounted on the right hand side of the frame 10 by its support 170. This interchangeable mounting of the supports 96 and 170 and their respective covers 142 and 236 on either of the frame side walls 28 and 26 is enabled by the mating and alignment of the side wall apertures 160 and 162 with the support apertures 158 and 176 and the plug-in securing elements 140 and 238 of the covers 142 and 236. Furthermore, the dimension of the cutout aperture 112 in frame side wall 28 defined by walls 109 and 111 is the same as the cutout aperture 180 in frame side wall 26 defined by 179 and 181 to further accommodate the mounting of either support on either side wall.

Figure 15:
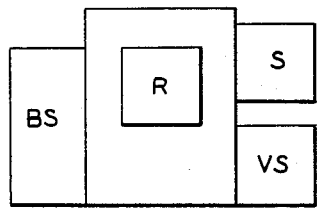
Figure 16:
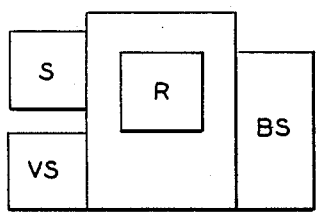

Referring to FIG. 15, the retractor has a spring and vehicle sensor mounted on the right hand side of the frame by the support 96. The belt sensor is mounted on the left hand side of the frame by a support 170 or, optionally, by a support 96. FIG. 16 is oppositely arranged with the spring and vehicle sensor on the left hand side and the belt sensor arranged on the right hand side.

Figure 17:
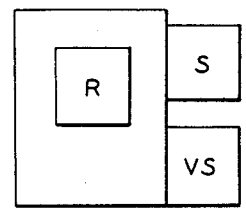
Figure 18:
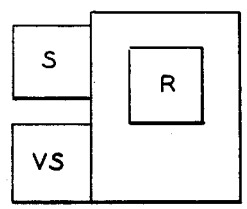

FIGS. 17 and 18 show the right and left hand arrangements of a retractor with the spring and the vehicle sensor mounted by a support 96. Even though the opposite side of the retractor carries neither the belt sensor or comfort device, a support 96 or 170 is installed to provide a bearing for the reel shaft 40 and a cover 142 or 236 is installed to retain the support and to also cooperate with the support to close any openings in the frame.

Figure 20:
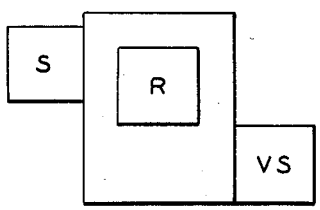
Figure 19:
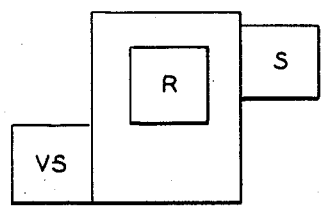

FIGS. 19 and 20 show yet another arrangement of the retractor in which the spring and vehicle sensor are employed but are mounted on opposite sides of the retractor frame. The vehicle sensor may be mounted on either the left hand side or right hand side of the frame via a support 96. The spring module is mounted on either the right hand or left hand side of the retractor by either a support 96 or a support 170 and the spring cover 142.

Figure 21:
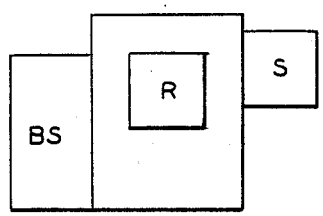
Figure 22:
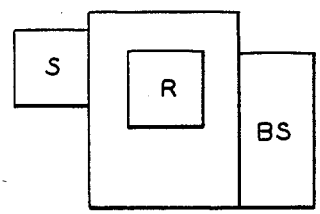

FIGS. 21 and 22 show yet another possible retractor arrangement where the spring is mounted on either the right or left hand side of the retractor and the belt sensor module is mounted on the opposite side of the retractor frame. Again, the spring module can be mounted by either a support 96 or support 170 in conjunction with a spring cover 142 while the belt sensor is mounted by its support 170.

In addition to the various optional and interchangeable assembly arrangements shown in FIGS. 13-22, it will be understood that each of the arrangements disclosed therein may have the belt exiting the retractor from either the front side of the reel as shown in FIG. 2 or the back side of the reel as shown in FIG. 3. This optional choice of belt exit from the reel is enabled by the lock bar 70 being optionally mounted as shown in FIGS. 2 or 3 for locking engagement with sprocket teeth oncoming from either the clockwise or counterclockwise belt unwinding direction. Furthermore, the first and second pairs of mounting bosses on the cup member 102 are optionally used for pivotally mounting the pawl 110 for engagement with the teeth 59 of gear 56 oncoming from either direction.

It will be understood that the various components shown in FIG. 4 are standardized for interchangeable and optional use in any of the retractor arrangements described herein. Nonetheless a few component parts of the retractor must be tooled to provide both right and left hand parts. These component parts include the gear 56, the lock bar 70, the spiral cam 182, the release cam 210, the clutch 250 and extension 254.

Thus, the seat belt retractor of this invention provides a minimum number of component parts which may be interchangeably and optionally assembled upon a standard frame in multiple variations to provide a combination of desired features, such as spring windup, belt sensitive lockup, vehicle sensitive lockup and comfort enhancing tension relief.

DESCRIPTION OF AN ALTERNATE EMBODIMENT

FIGS. 23, 24, 25 and 26 disclose an alternate embodiment of the invention in which some of the various components described hereinbefore with respect to FIGS. 1 through 22 have alternate details of construction and assembly. In order to simplify the comparison and understanding of these differences, like reference numerals are employed for like construction features of the alternate embodiment and the following description will generally be directed to the differences and will employ additional reference numerals as appropriate to describe these differences.

THE FRAME

Figure 23:
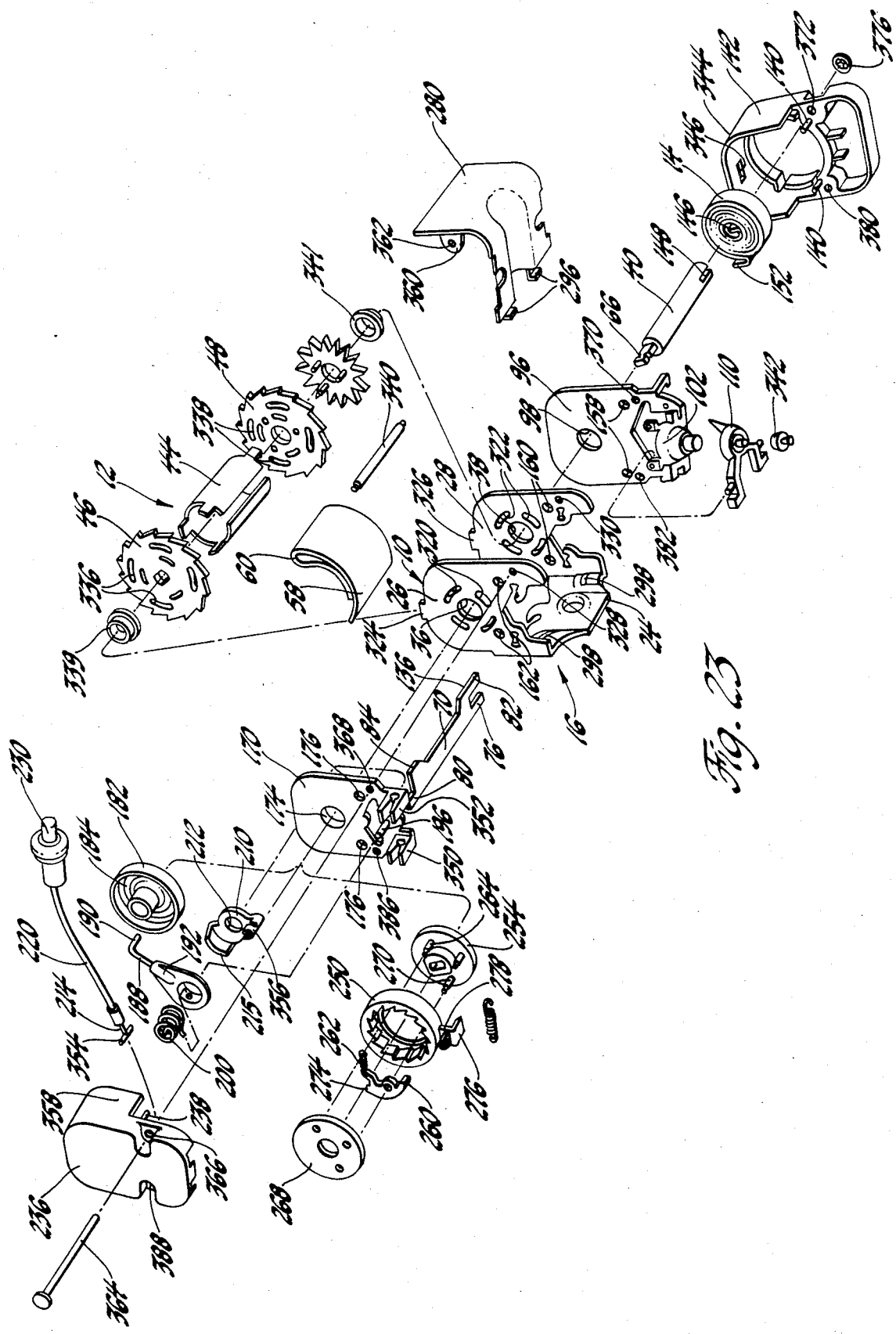
FIG. 23 is an exploded perspective view similar to FIG. 4 but showing another embodiment of the invention which can also be assembled in the various ways shown in FIGS. 13 through 22.

As best seen in FIG. 23, the side walls 26 and 28 of retractor frame 10 respectively have a plurality of lightening apertures 320 and 322 which serve to lighten the retractor frame 10. In addition, the side walls 26 and 28 respectively have tabs 324 and 326 projecting upwardly from the top thereof. Furthermore, the side walls 26 and 28 respectively have aligned apertures 328 and 330. Other features of the retractor frame 10 are essentially identical with the embodiment of FIGS. 1–22 and accordingly are identified by like numerals.

THE REEL

The sprockets 46 and 48 of the reel 12 respectively have a plurality of apertures 336 and 338 which lighten the weight of the reel. The end loop 60 enters the spool 44 and a retaining pin 340 is inserted into the end loop 60 to effect the anchorage of the restraint belt 58 to the spool 44. Flanged bushings 339 and 341, best seen in FIGS. 23 and 26, are installed in the aligned apertures 36 and 38 of frame side walls 26 and 28 to journal the reel shaft 40 for rotation.

THE VEHICLE SENSOR AND SPRING

The vehicle sensor 16 is carried by the support 96 and includes a mushroom shaped inertia weight 342 which seats in cup member 102 and operates the pawl 110. The support 96 has a pair of apertures 158 which align with a pair of apertures 160 in the frame side wall 28. The support 96 is mounted on the frame side wall by a pair of plug-in elements 140 provided on the spring cover 142. The spring cover 142 also has an integral flange 344 along the sides and top thereof which project over and surround the outer edge of the support 96 and the side wall 28. This flange 344 has a rectangular opening 346 which is installed over the tab 326 of the frame side wall 28 so that the support 96 is captured between the spring cover 142 and the frame side wall 28. The plug-in elements 140 are heat staked to provide a permanent connection between the spring cover 142 and the frame side wall 28 with the support 96 captured therebetween.

THE COMFORT DEVICE AND BELT SENSOR

The comfort device is carried by support 170 which has integral bosses 350 and 352 for receiving and mounting the sheath 220 of the cable 214. The end of the cable 214 carries a transverse pin 354 which slides into a cylindrical boss 356 of the release cam 210. The support 170 has a pair of apertures 176 which align with a pair of apertures 162 of the frame side wall 26. Cover 236 has a pair of plug-in elements 238 which extend through the aligned apertures 176 of the support 170 and 162 of the frame side wall 26. The plug-in elements 238 are heat staked to provide a permanent attachment of the cover 236 on the frame side wall 26 and thereby capture the support 170 in abutting relationship with the frame side wall 26.

The cover 236 has a flange 358 which projects over and surrounds edges of the support 170 and the frame side wall 26 to thereby capture the support 170 between the cover 236 and the frame side wall 26 as best seen in FIGS. 24 and 26. The top wall of the flange 358 has a rectangular opening 360 which fits over the tab 324 of side wall 26 to retain the cover 236 upon the side wall 28.

THE COVER

The cover 280 for enclosing the retractor covers only the lower half of the retractor whereas the cover 280 shown hereinbefore with respect to the embodiment of FIGS. 1-22 covered the top half of the retractor as well. As best seen in FIG. 23, the cover 280 has a pair of downturned projections 296 at its lower end thereof which snap-fit into apertures 298 in the frame base wall 24. Furthermore, as best seen in FIG. 23, the cover 280 has a pair of ears 360 which have aligned apertures 362. A molded plastic retaining pin 364 is provided for retaining the cover 280 on the retractor. As best seen in FIGS. 23 and 24, the retaining pin 364 extends through aperture 366 of cover 236, the aperture 368 of the support 170, the aperture 328 of the frame side wall 26, the aligned apertures 362 of the ears 360, the aperture 330 of frame side wall 28, the aperture 370 of the support 96 and aperture 372 of the cover 142. These apertures 336, 368, 328, 362, 330, 370 and 372 are all aligned with one another to permit the installation of the retaining pin 364 therethrough. A retainer 376 is pushed onto the end of the pin 364 to prevent its removal.

OPTIONAL AND INTERCHANGEABLE ASSEMBLY ARRANGEMENTS

The embodiment of FIGS. 23-26 may be interchangeably and optionally assembled upon a standard retractor frame to provide the same various combinations of desired features, arrangements and package sizes, as schematically represented in FIGS. 13 through 22.

The covers 142 and 236 and the supports 96 and 170 are adapted for mounting upon either of the frame side walls 26 and 28 because the mounting features of the frame side walls, including the tabs 324 and 326, the apertures 160 and 162, and apertures 112 and 180 are matingly aligned with the various mounting elements of the supports and covers. For example, plug-in elements 140 and rectangular slot 346 of cover 142 are engageable with either the apertures 160 and tab 326 of side wall 28 or with the apertures 162 and tab 324 of side wall 26. Furthermore, as best seen in FIG. 23, the shape of the side walls 26 and 28 is symmetrical about the centerline of the side walls so that the flange 344 of cover 142 will fit over and surround the edges of either of the frame side walls 26 or 28. Furthermore, as best seen in FIG. 23, the cover 142 has an aperture 380 and the support 96 has an aligned aperture 382 which are adapted to align with one another and with the aperture 328 of the frame side wall 26 in those retractor configurations where the support 96 and cover 142 are installed upon the frame side wall 26. Likewise, the support 170 has an aperture 386 and the cover 236 has an aperture 388 which align with one another and with the aperture 330 of the frame side wall 28 in those retractor configurations where the support 170 and cover 232 are to be mounted upon the frame side wall 28. Accordingly, whichever retractor configuration is used, aligned and mated apertures are provided to admit the plastic retaining pin 364 for retaining the cover 280 upon the retractor.

Thus, upon consideration of the alternate embodiment of FIGS. 23–26, it will be understood that the optional and interchangeable assembly of the retractor is enabled by the cooperation of various mating and aligned mounting features and elements which interact between the frame side walls, the support members, the covers, and control mechanisms to enable optional and interchangeable utilization of the support members and control mechanisms on either of the side walls of the retractor frame. Furthermore, and more particularly, these cooperating mounting features and mounting elements can include various combinations of apertures cooperating with mounting elements, frame tabs cooperating with apertures, and also the configuration of the outline shapes of the frame side walls and supports to be captured by flanges provided on the covers.

Thus, while the invention is described herein with respect to the disclosed embodiments of the invention, the invention is not limited to the particular cooperating mounting features and elements but rather only to thee extent set forth in the appended claims.

DESCRIPTION OF ANOTHER ALTERNATE EMBODIMENT

Figure 27:
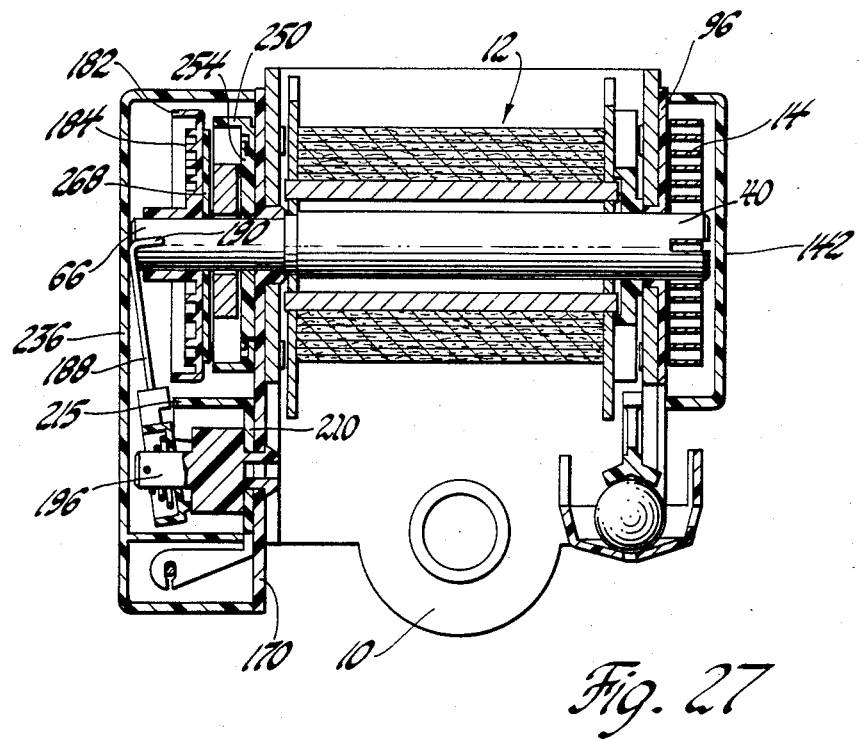
FIG. 27 is a front elevation view of yet another embodiment of the invention in which the retractor has both a comfort device and a belt sensor.

Referring to FIG. 27, there is shown another optional and interchangeable arrangement of the invention. In particular, the retractor has both a comfort device and a belt sensor as well as winding spring and vehicle sensor which are assembled in the arrangement shown in FIG. 28. The comfort mechanism and belt sensor may be mounted on either side wall of the retractor frame. The retractor of FIG. 27 is constructed of components which are generally the same as the components shown in FIG. 4. The frame 10, the reel 12, support 96, cover 142 and spring 14 are identical with FIG. 4 and are designated by like numerals.

The neck down flattened end 66 of the reel shaft 40 is extended in its length so that both the belt sensor 18 and the comfort device 20 can be fitted onto the end of the shaft. More particularly, the annular clutch 250, extension 254 and retainer 268 are first installed upon the flattened end 66 of the shaft. Then the spiral cam 182 of the comfort device 20 is fitted onto the shaft. The support 170 is similar to that of FIGS. 1-22 except that the pivot pin 196 thereof has an extended length to mount the follower pawl 188 in proper operating alignment with respect to the spiral cam 182. Furthermore, the release cam 20 has its ramp surface 215 extended sufficiently to properly align with the follower pawl 188. Furthermore, the cover 236 has an extended depth as necessary to cover the extended length of the reel shaft and the belt sensor 18 and comfort device 20.

Figure 28:
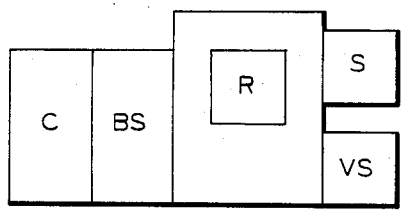
FIGS. 28 and 29 are schematic representations showing the various ways in which the spring, vehicle sensor, the belt sensor and comfort device of FIG. 27 may be interchangeably assembled.
Figure 29:
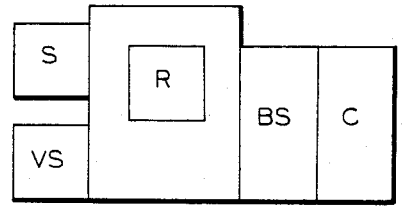

FIGS. 28 and 29 provide a schematic representation of the embodiment of FIG. 27 and in particular show that the belt, sensor and comfort device can be mounted on either side wall of the retractor frame to provide the desired retractor package.

The embodiments of the invention in which an exclusive property or privilege is claimed are defined as follows:

1. A seat belt retractor comprising:
   a belt reel;
   a frame having a base wall adapted for attachment on a vehicle body and first and second spaced apart side walls with aligned apertures for receiving a reel shaft to rotatably mount the belt reel between the side walls;
   a generally planar support member adapted to abut against one of the frame side walls on the face thereof opposite the belt reel and carry a control mechanism operative to control rotation of the belt reel relative to the frame;
   a cover adapted to abut against the support member and enclose the control mechanism; and
   wherein each of said first and second side walls and said support member have similarly configured and aligned apertures therethrough and wherein said cover has plug-in securing elements matingly configured and aligned with the apertures of the first and second side walls and the support member whereby to enable interchangeable and optional utilization of said support member and the control mechanism carried thereby on either of said first and second side walls of the retractor frame.

2. A seat belt retractor comprising:
   a shaft mounted belt reel;
   a frame having first and second spaced apart side walls with aligned apertures for receiving the reel shaft;
   first and second generally planar support members adapted to abut respectively against one of the side walls, said support members each having associated means adapted to carry control mechanism operative to control the rotation of the belt reel relative to the frame;
   first and second cover members adapted to respectively abut against the support members and enclose the control mechanism; and
   wherein each of said first and second side walls and said first and second support members have similarly configured and positioned apertures therethrough which align with one another regardless which of the support members is abutted with which of said side walls, and wherein each of the first and second covers have associated securing elements matingly configured and positioned with respect to the apertures of said first and second frame side walls and said first and second support members to enable interchangeable utilization of said support members and the control mechanisms carried thereby on either of said first and second side walls of the retractor frame.

3. In a seat belt retractor having a belt reel rotatably supported between spaced apart frame side walls and two or more selected reel rotation control mechanisms mounted on the side walls and including at least a rewind spring control mechanism, the improvement comprising:

first and second planar support members for respectively abutting the side walls and having associated means for supporting the selected of said control mechanisms, cover means for enclosing the control mechanisms, said reel, support members, control mechanisms and cover means including mounting elements, and said frame side walls having mounting means therein for receiving said mounting elements for mounting the reel, the support members, the control mechanisms, and cover means to the frame side walls, said mounting elements being configured and positioned similiarly to the mounting means to enable optional and interchangeable utilization of said support members and control mechanisms on either of said first and second side walls of the retractor frame.

4. In a seat belt retractor having a reel supported at opposite ends in a support frame and wherein belt winding and unwinding reel rotation is controlled by a spring rewind control mechanism and one or more additional selected control mechanisms including vehicle sensing or belt sensing control mechanisms for operating a lock bar blocking belt unwinding reel rotation and a comfort control mechanism for blocking belt rewinding reel rotation characterized in that each of said frame at either end of said reel and said spring rewind control mechanism and said one or more additional of the other control mechanisms have mounting means thereon, said mounting means of the spring rewind control mechanism and said one or more additional of the other control mechanisms being similiarly configured and positioned to the frame mounting means at either end of the reel to enable selective interchangeable mounting of said control mechanisms to said frame at either end of said reel whereby the retractor is universally adapted for interchangeable installation of all said control mechanisms to said frame at either end of said reel.

* * * * *